(12) United States Patent
Kwilosz

(10) Patent No.: US 7,360,744 B2
(45) Date of Patent: Apr. 22, 2008

(54) TIE STRAP ASSEMBLY

(75) Inventor: Mark J. Kwilosz, Chicago, IL (US)

(73) Assignee: Illinois Tool Works Inc, Glenview, IL (US)

( * ) Notice: Subject to any disclaimer, the term of this patent is extended or adjusted under 35 U.S.C. 154(b) by 162 days.

(21) Appl. No.: 11/377,869

(22) Filed: Mar. 16, 2006

(65) Prior Publication Data

US 2007/0057124 A1  Mar. 15, 2007

Related U.S. Application Data

(60) Provisional application No. 60/717,091, filed on Sep. 14, 2005.

(51) Int. Cl.
*B65D 63/00* (2006.01)

(52) U.S. Cl. .................. 248/74.3; 248/74.1; 248/68.1; 292/307 R

(58) Field of Classification Search ............... 248/74.3, 248/74.1, 68.1, 73, 70, 71, 69, 62, 60, 909; 24/16; 292/307 A, 307 R, 315, 316, 317, 292/321, 323, 325, 318, 319
See application file for complete search history.

(56) References Cited

U.S. PATENT DOCUMENTS

| | | | | |
|---|---|---|---|---|
| 4,705,245 A | * | 11/1987 | Osada | 248/74.3 |
| 5,106,040 A | * | 4/1992 | Cafmeyer et al. | 248/73 |
| 5,112,013 A | * | 5/1992 | Tolbert et al. | 248/74.3 |
| 5,730,401 A | * | 3/1998 | Takeda et al. | 248/69 |
| 6,105,908 A | | 8/2000 | Kraus | |
| 6,685,144 B1 | * | 2/2004 | Wochnick | 248/73 |
| 7,062,820 B1 | | 6/2006 | Oestreich | |
| 2005/0146149 A1 | | 7/2005 | Agayof et al. | |
| 2007/0194181 A1 | * | 8/2007 | Rosemann et al. | 248/74.3 |

FOREIGN PATENT DOCUMENTS

| | | |
|---|---|---|
| DE | 19746424 | 4/1999 |
| WO | WO 2004 103848 | 12/2004 |

* cited by examiner

*Primary Examiner*—Amy J. Sterling
(74) *Attorney, Agent, or Firm*—Mark W. Croll; Paul F. Donovan

(57) ABSTRACT

A tie strap assembly includes a strap, a fastener rail or beam and a fastener. The strap is connected to a lock housing, wherein a distal end of the strap is configured to pass into a lock passage of the lock housing to form a loop. The fastener rail is offset from the strap, such that the strap does not directly contact the fastener rail. A fastener is slidably secured on the fastener rail, and is therefore, not in contact with the strap. Wires bundled within the strap do not contact the fastener. Thus, the fastener may be easily slidably adjusted on the fastener rail without interference from bundled wires or the strap.

19 Claims, 3 Drawing Sheets

TIE STRAP ASSEMBLY

RELATED APPLICATIONS

This application relates to and claims priority benefits from U.S. Provisional Patent Application 60/717,091 entitled "Tie Strap," filed Sep. 14, 2005, which is hereby incorporated by reference in its entirety.

FIELD OF THE INVENTION

Embodiments of the present invention generally relate to a tie strap assembly, and more particularly to a tie strap assembly configured to wrap around and secure various items, such as wire bundles.

BACKGROUND OF THE INVENTION

Tie straps are used in many applications across many industries in order to fasten objects of varying dimensions. Objects, such as wires, may be bundled together with a single tie strap.

FIG. 1 illustrates an isometric exploded view of a conventional tie strap assembly 10. The tie strap assembly 10 includes a flexible strap 12 having a lock housing 14. The lock housing 14 includes walls 16 that define a lock passage 18. A distal end 20 of the strap 12 is positioned through the lock passage 18, thereby forming a loop. The loop is formed around items to be bundled, such as wires. The distal end 20 of the strap 12 is pulled through the lock passage 18, thereby bundling the wires together. In order to tighten the bundle together, the strap 12 continues to be pulled through the lock passage 18. The lock passage 18 includes features, such as ridges, clasps, barbs, protrusions or the like (not shown in FIG. 1) that engage reciprocal features of the strap 14, such as hooks, latches, or the like (not shown in FIG. 1) so that the strap 14 does not retreat within the lock housing 14. Thus, a user may cinch or bundle a plurality of wires to a desired tightness within the loop of the tie strap 10.

In order to secure the tie strap assembly 10 to a particular structure, the tie strap assembly 10 also includes a separate and distinct fastener 22. The strap 12 is integrally molded as a single piece, while the fastener 22 is molded as a separate and distinct piece. Both the strap 12 and the fastener 22 may be formed of molded plastic.

The fastener 22 includes a housing 24 defining a strap passage 26. A fastening member 28, such as a barb, clasp, screw, or the like, is integrally formed with the housing 24.

FIG. 2 illustrates an isometric view of the conventional tie strap assembly 10. The fastener 22 is slid onto the strap 12 by way of the distal end 20 of the strap 12 being fed through the strap passage 26. Typically, the fastener 22 is slidably secured to the strap 12 before the distal end 20 of the strap 12 is fed through the lock passage 18 of the lock housing 14. Thus, the tie strap assembly 10 may be secured to a structure through the fastener 22, and loose items proximate the structure may be securely bundled by looping the distal end 20 of the strap 12 through the lock passage 18.

FIG. 3 illustrates a top plan view of the conventional tie strap assembly 10. As shown in FIG. 3, the fastener 22 is aligned with the strap 12. That is, the longitudinal axis x of the fastener 22 and the longitudinal axis y of the tie strap 12 are in the same vertical plane.

When the strap 12 is securely cinched around items, such as wires, the fastener 22 is not easily slid or adjusted over the strap 12. For example, when the strap 12 is cinched tightly over a bundle of wires, the force exerted by the strap 12 around the bundle compresses the bundle into the fastener 22. The fastener 22 may be compressively sandwiched or trapped between the strap 12 and the cinched wire bundle. A user may find it difficult to adjust the fastener 22 with respect to the cinched wire bundle, due to the added pressure exerted by the wire bundle into the fastener 22.

Thus, a need exists for an improved tie strap assembly that may be easily adjusted for mounting to a structure, even when bundled items are securely cinched by the tie strap assembly.

SUMMARY OF THE INVENTION

Certain embodiments of the present invention provide a tie strap assembly configured to be secured to a structure and bundle a plurality of wires. The tie strap assembly may include a lock housing defining a lock passage, a strap, a fastener rail or beam, an extension beam, a strap beam, and a fastener.

The strap may connect to the lock housing through a lock housing beam, wherein a distal end of the strap is configured to pass into the lock passage of the lock housing to form a bundling loop. The lock housing prevents the strap from retreating within the lock passage, or otherwise moving in a direction opposite to that of the direction in which it entered the lock passage.

The fastener rail includes first and second ends. The fastener rail is offset from the strap. For example, the fastener rail and the strap do not lie in the same vertical plane.

The extension beam may integrally connect the first end of the fastener rail to the lock housing. The strap beam may integrally connect the second end of the fastener rail to at least one of the strap and the lock housing beam. A gap may be formed between the lock housing beam, the extension beam, the strap beam, and the fastener rail.

The fastener may be slidably secured on the fastener rail, and may be configured to slide from the extension beam to the strap beam. The fastener includes a rail-securing housing integrally connected to a fastening member, wherein the rail-securing housing defines a rail passage through which the fastener rail passes. The strap is configured to securely bundle a plurality of wires that do not abut the fastener.

The rail-securing housing may include a hinge integrally formed with a cover and a latch, wherein the cover may be pivoted into a latched position by way of the hinge.

The longitudinal axis of the fastener rail is in a different X, Y, and/or Z plane than the longitudinal axis of the strap. The strap and the fastener rail may not be coplanar with respect to at least one of the X, Y, and Z planes.

Figure 1:
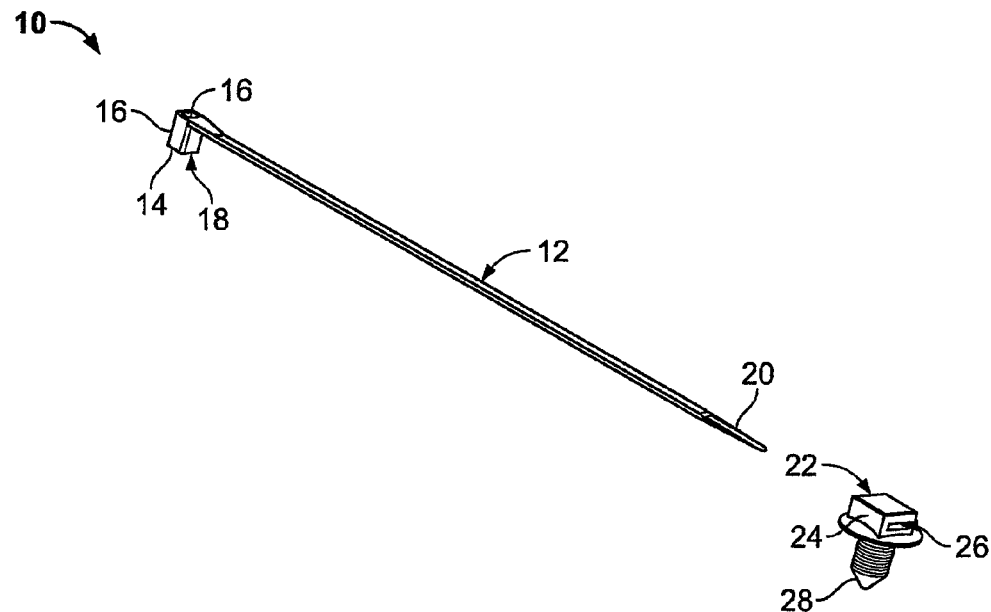
FIG. 1 illustrates an isometric exploded view of a conventional tie strap.
Figure 2:
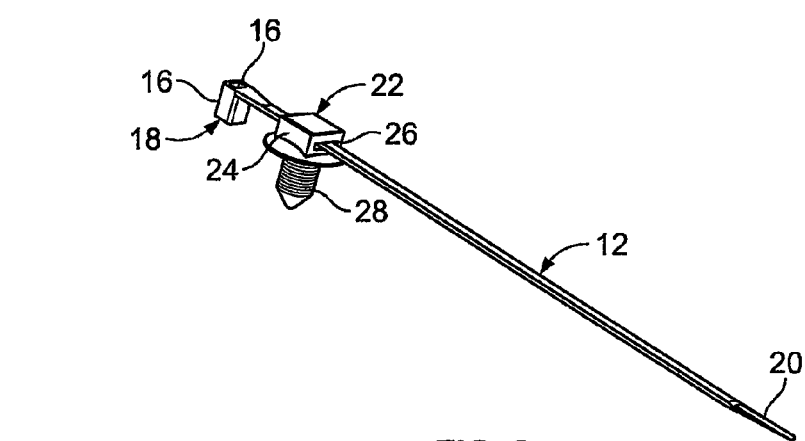
FIG. 2 illustrates an isometric view of a conventional tie strap.
Figure 3:
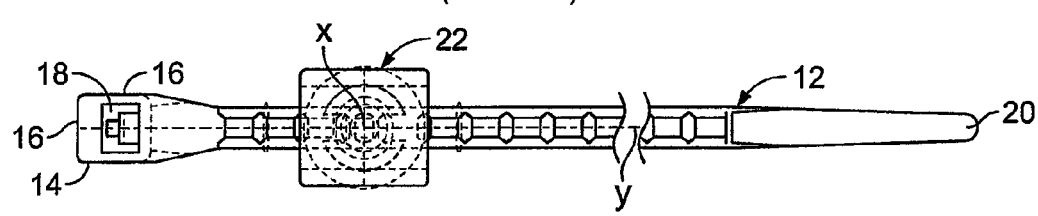
FIG. 3 illustrates a top plan view of a conventional tie strap.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

Figure 4:
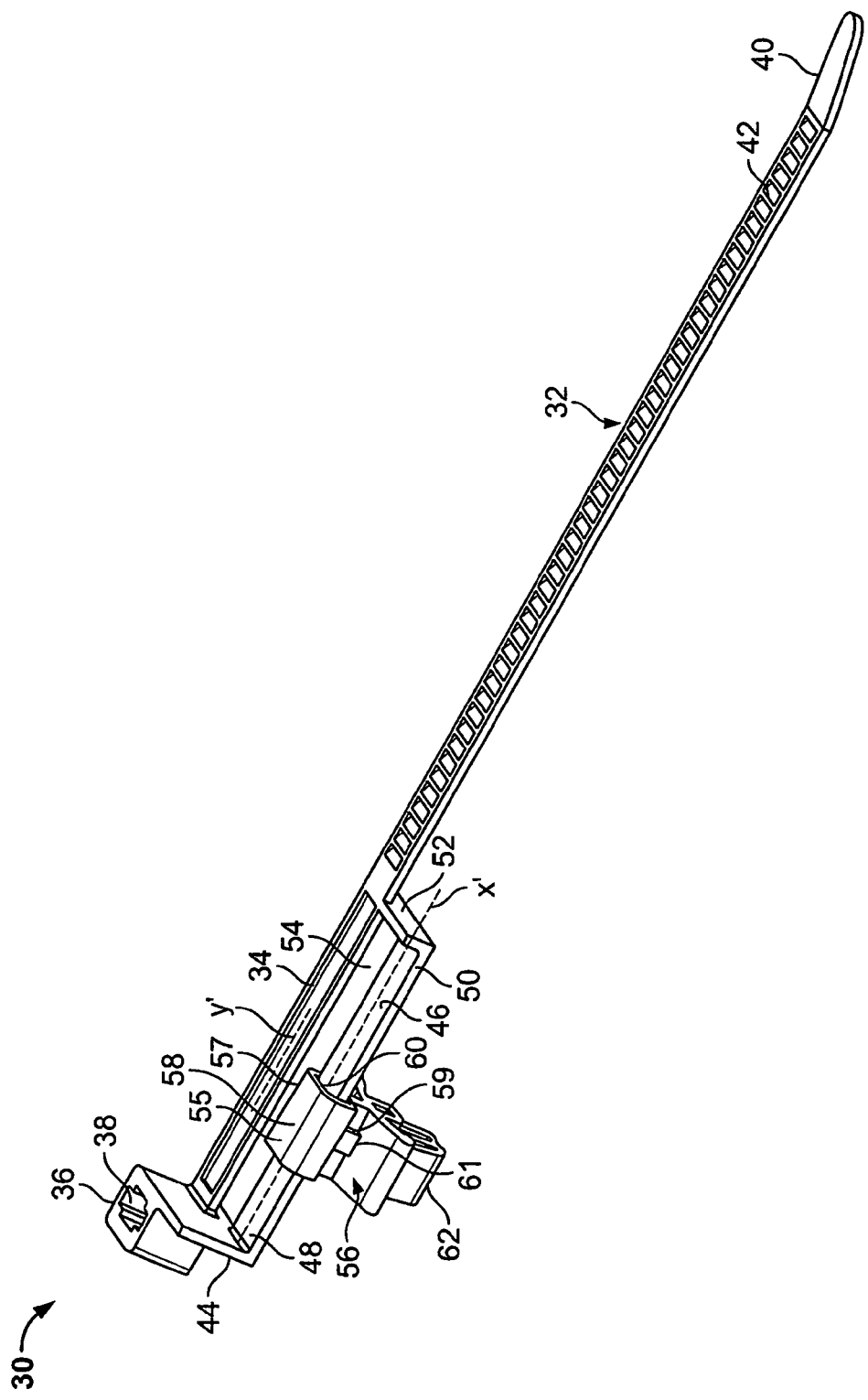
FIG. 4 illustrates an isometric view of a tie strap assembly according to an embodiment of the present invention.

FIG. 4 illustrates an isometric view of a tie strap assembly 30 according to an embodiment of the present invention. The tie strap assembly 30 includes a strap 32 integrally connected to a lock housing beam 34, which is in turn integrally connected to a lock housing 36. The lock housing 36 includes a lock passage 38 formed therethrough. A distal end 40 of the strap 32 is fed into the lock passage 38, thereby forming a loop around items to be bundled. The distal end 40 is passed through the lock passage 38 so that features on the strap 32, such as hooks, claps, barbs, or other such protrusions 42 engage reciprocal features (not shown) within the lock housing 36 that prevent the strap 32 from retreating within the lock passage 38.

The lock housing 36 includes an extension wall or beam 44 that is integrally connected to a fastener beam or rail 46 that may be parallel to, but offset from, the beam 34. One end 48 of the fastener beam 46 integrally connects to the extension wall 44, while the other end 50 integrally connects to a strap beam 52, which in turn integrally connects to the strap 32. As shown in FIG. 4, the fastener beam 46 may connect to the extension wall 44 and the strap beam 52 at right angles. A gap 54 may be formed between the beam 34 and the fastener beam 46. Optionally, additional support beams may exist between the beam 34 and the fastener beam 46.

The longitudinal axis x' of the fastener beam 46 and the longitudinal axis y' of the strap 32 and the beam 34 are in different vertical planes. Thus, the fastener beam 46 and the strap 32 are not vertically aligned with one another. Instead, the fastener beam 46 is offset from the beam 34.

The strap 32, the beam 34, and the fastener beam 46 are all flexible. Thus, when the strap 32 is looped into the lock passage 38 of the lock housing, the beam 34 and the fastener beam 46 also flex and bend in relation to the looping of the strap 32. As the radius of the loop formed by the strap 32 decreases, the fastener beam 46 forms a tighter curve.

A fastener 56 is slidably secured to the fastener beam 46. The fastener 56 includes a beam-securing housing 58 defining a beam passage 60. The fastener 56 slidably secures around the fastener beam 46 through the beam passage 60. That is, the fastener beam 46 passes through the beam passage 60 so that the fastener 56 may slide along the fastener beam 46 from the extension wall 44 to the strap beam 52. The fastener 56 may include a hinge 57 integrally connected to a cover 55. The cover 55 may be pivoted into a latching position such that a tab 59 snapably secures into a notch or slot 61, thereby defining the beam passage 60. Thus, a separately molded fastener 56 may be slidably secured to the fastener beam 46.

The fastener 56 also includes a fastening member 62, such as a clip, barb, clasp, screw, or the like underneath the beam-securing housing 58. The fastening member 62 is configured to secure into a reciprocal feature, such as a hole, of a structure, in order to secure the tie strap assembly 30 to the structure.

Because the fastener 56 is offset from the strap 32, the fastener 56 is not compressively sandwiched between a bundle of wires and the strap 32. Moreover, the fastener 56 may not even contact a portion of the bundle. When a wire bundle is securely bundled by the strap 32, the cinching force exerted by the strap 32 into the wired bundle is not translated or transferred onto or into the fastener 56. The fastener 56 may be slid over the fastener beam 46 without an interfering pressure being exerted into the fastener 56 by the strap 32 and the cinched wire bundle. Thus, the fastener 56 may be easily adjusted with respect to the tie strap assembly 30, even when a plurality of wires is securely bundled by the strap 32.

Additionally, the horizontal plane of the fastener beam 48 may be below the horizontal plane of the beam 34. Because the fastener beam 48 may be lower than the beam 34, the fastener 56 may be less susceptible to abutting, or otherwise engaging a wire bundle secured over the beam 34 within the loop formed by the strap 32.

Figure 5:
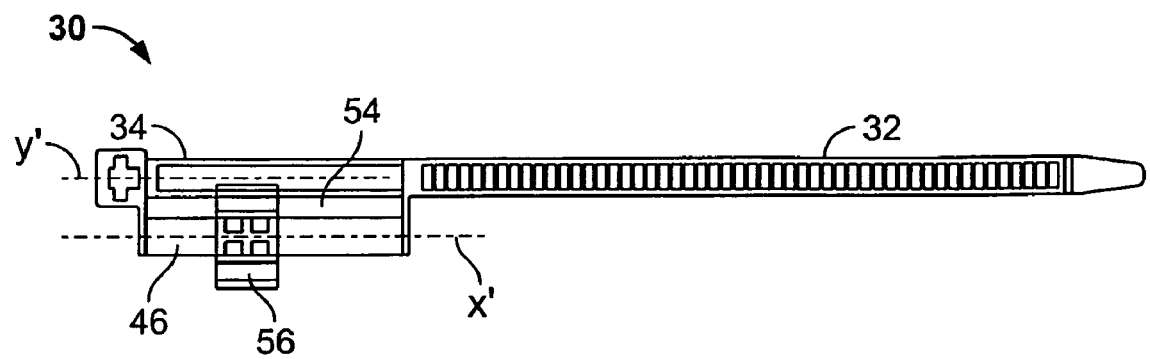
FIG. 5 illustrates a top plan view of a tie strap assembly according to an embodiment of the present invention.
Figure 6:
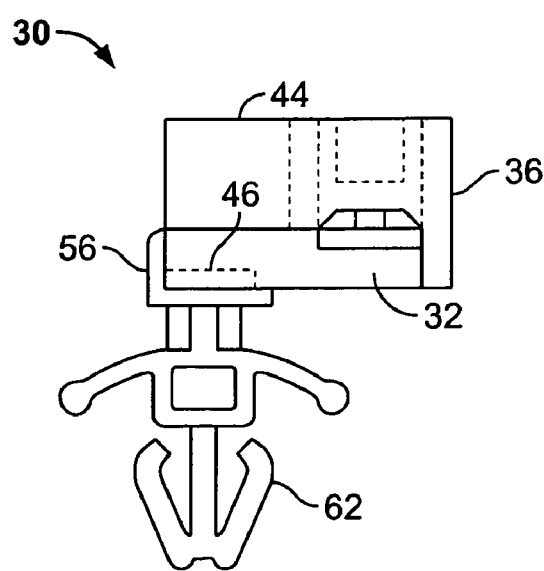
FIG. 6 illustrates a front elevational view of a tie strap assembly according to an embodiment of the present invention.

FIG. 5 illustrates a top plan view of the tie strap assembly 30, while FIG. 6 illustrates a front elevational view of the tie strap assembly 30. As shown in FIGS. 5 and 6, the fastener 56 is slidably mounted on the fastener beam 46. The fastener beam 46 is offset from the beam 34, which is aligned with the strap 32 such that the longitudinal axis x' of the fastener beam 46 and the fastener 56 is in a different vertical plane than that of the longitudinal axis y' of the beam 34 and the strap 32. Thus, the fastener 56 is not compressed between any portion of the strap 32 and the wire bundle. The fastener 56 may be slid or adjusted over the fastener beam 46 without the additional force of the cinched wire bundle being exerted into the fastener 56.

Thus, embodiments of the present invention provide an improved tie strap assembly that may be easily adjusted for mounting to a structure, even when bundled items are securely cinched by the tie strap assembly.

It is to be understood that terms such as above, below, lower, and upper are relative terms. While these terms have been used to describe embodiments of the invention, such terms are merely used with respect to the drawings. For example, if the tie strap assembly 10 was secured to a ceiling, then the horizontal plane of the fastener beam 46 may be above the horizontal plane of the beam 34. That is, the orientations described may be inverted depending on the placement of the tie strap assembly 30.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A tie strap assembly comprising:
a strap connected to a lock housing, wherein a distal end of said strap is configured to pass into a lock passage of said lock housing to form a loop;
a fastener rail offset from said strap;
a fastener slidably secured on said fastener rail;
a lock housing beam integrally connecting said strap to said lock housing;
an extension wall integrally connecting one end of said fastener rail to said lock housing, and
a strap beam integrally connecting another end of said fastener rail to at least one of said strap and said lock housing beam,
wherein a gap is formed between said lock housing beam, said extension wall, said strap beam, and said fastener rail.

2. The tie strap assembly of claim 1, wherein said fastener comprises a rail-securing housing integrally connected to a fastening member, wherein said rail-securing housing defines a rail passage through which the fastener rail passes.

3. A tie strap assembly comprising:
a strap connected to a lock housing, wherein a distal end of said strap is configured to pass into a lock passage of said lock housing to form a loop;
a fastener rail offset from said strap; and
a fastener slidably secured on said fastener rail,
wherein said fastener comprises a rail-securing housing integrally connected to a fastening member, wherein said rail-securing housing defines a rail passage through which the fastener rail passes, and
wherein said rail-securing housing comprises a hinge integrally formed with a cover and a latch, wherein said cover is pivoted into a latched position by way of said hinge.

4. The tie strap assembly of claim 2, wherein said fastening member is a clip configured to be secured within a hole.

5. The tie strap assembly of claim 1, wherein said strap comprises a first longitudinal axis and said fastener rail comprises a second longitudinal axis, wherein said first longitudinal axis is in a different plane than said second longitudinal axis.

6. The tie strap assembly of claim 1, wherein said strap and said fastener rail are not coplanar.

7. The tie strap assembly of claim 1, wherein said strap is configured to securely bundle a plurality of wires that do not abut said fastener.

8. A tie strap assembly configured to be secured to a structure and bundle a plurality of wires, the tie strap assembly comprising:
a lock housing defining a lock passage;
a strap connected to a lock housing through a lock housing beam, wherein a distal end of said strap is configured to pass into said lock passage of said lock housing to form a loop, wherein said lock housing prevents said strap from retreating within said lock passage;
a fastener rail having first and second ends, wherein said fastener rail is offset from said strap;
an extension beam integrally connecting said first end of said fastener rail to said lock housing;
a strap beam integrally connecting said second end of said fastener rail to at least one of said strap and said lock housing beam; and
a fastener slidably secured on said fastener rail, said fastener being configured to slide from said extension beam to said strap beam.

9. The tie strap assembly of claim 8, wherein a gap is formed between said lock housing beam, said extension wall, said strap beam, and said fastener rail.

10. The tie strap assembly of claim 8, wherein said fastener comprises a rail-securing housing integrally connected to a fastening member, wherein said rail-securing housing defines a rail passage through which the fastener rail passes.

11. The tie strap assembly of claim 10, wherein said rail-securing housing comprises a hinge integrally formed with a cover and a latch, wherein said cover is pivoted into a latched position by way of said hinge.

12. The tie strap assembly of claim 10, wherein said fastening member is a at least one of a clip, barb, clasp, or protrusion configured to be secured within a hole.

13. The tie strap assembly of claim 8, wherein said strap comprises a first longitudinal axis and said fastener rail comprises a second longitudinal axis, wherein said first longitudinal axis is in a different plane than said second longitudinal axis.

14. The tie strap assembly of claim 8, wherein said strap and said fastener rail are not coplanar.

15. The tie strap assembly of claim 8, wherein said strap is configured to securely bundle a plurality of wires that do not abut said fastener.

16. A tie strap assembly configured to be secured to a structure and bundle a plurality of wires, the tie strap assembly comprising:
a lock housing defining a lock passage;
a strap connected to a lock housing through a lock housing beam, wherein a distal end of said strap is configured to pass into said lock passage of said lock housing to form a loop, wherein said lock housing prevents said strap from retreating within said lock passage;
a fastener rail having first and second ends, wherein said fastener rail is offset from said strap;
an extension beam integrally connecting said first end of said fastener rail to said lock housing;
a strap beam integrally connecting said second end of said fastener rail to at least one of said strap and said lock housing beam, wherein a gap is formed between said lock housing beam, said extension beam, said strap beam, and said fastener rail; and
a fastener slidably secured on said fastener rail, said fastener being configured to slide from said extension beam to said strap beam, said fastener comprising a rail-securing housing integrally connected to a fastening member, wherein said rail-securing housing defines trail passage through which said fastener rail passes, and wherein said strap is configured to securely bundle a plurality of wires that do not abut said fastener.

17. The tie strap assembly of claim 16, wherein said rail-securing housing comprises a hinge integrally formed with a cover and a latch, wherein said cover is pivoted into a latched position by way of said hinge.

18. The tie strap assembly of claim 16, wherein said strap comprises a first longitudinal axis and said fastener rail comprises a second longitudinal axis, wherein said first longitudinal axis is in a different plane than said second longitudinal axis.

19. The tie strap assembly of claim 16, wherein said strap and said fastener rail are not coplanar.

* * * * *